Sept. 29, 1942.    J. H. CRUICKSHANK    2,297,347
PALLET
Filed Feb. 2, 1942    2 Sheets-Sheet 1
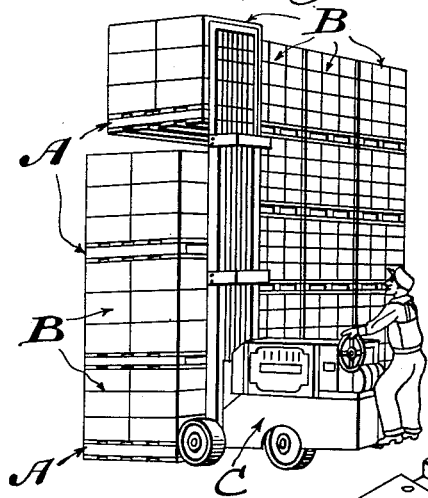
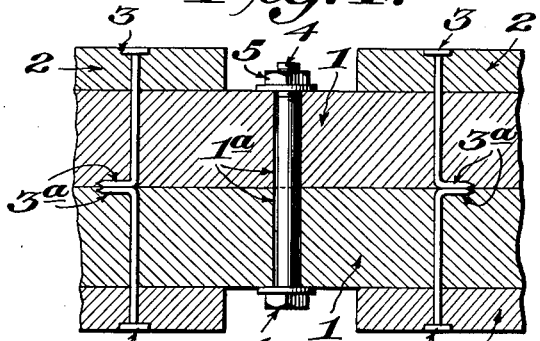
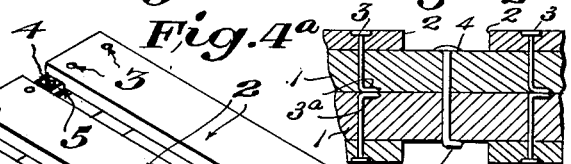
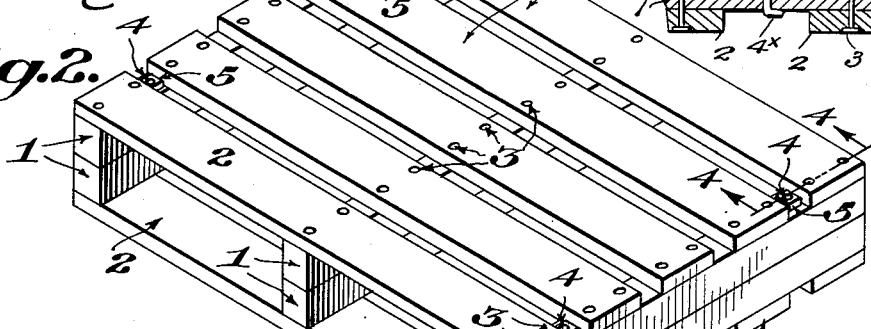
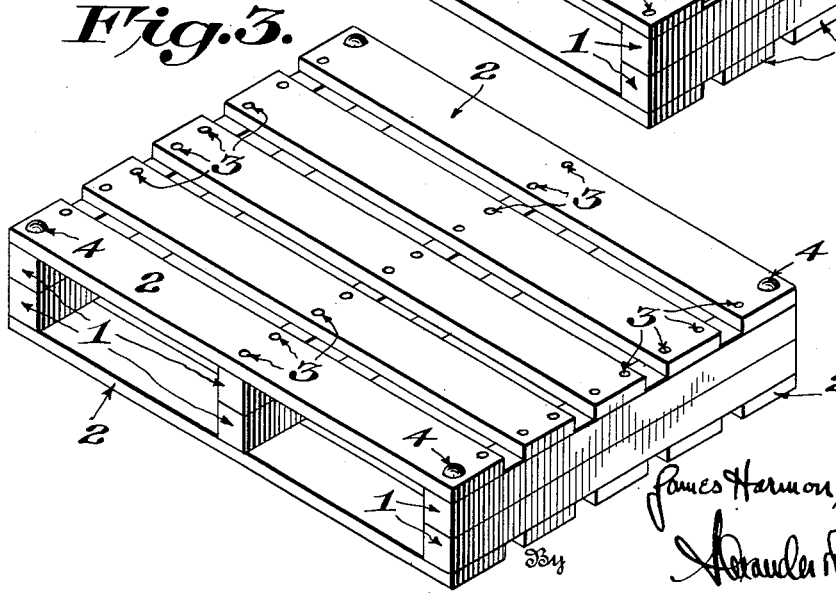
Inventor
James Harmon Cruickshank
By Alexander Dowell
Attorneys

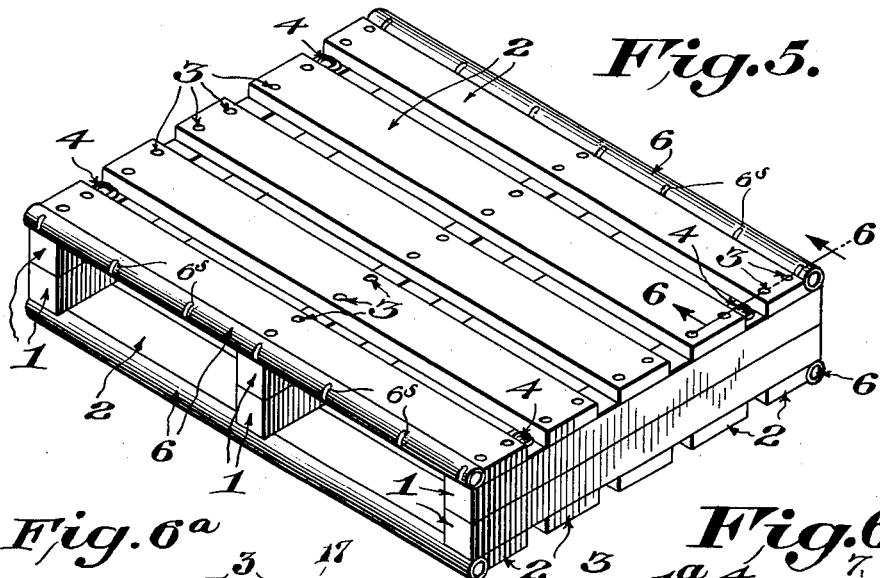
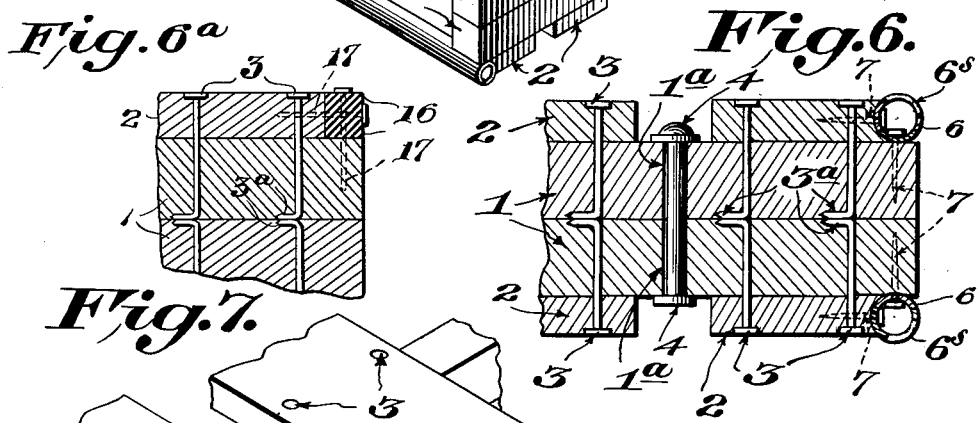
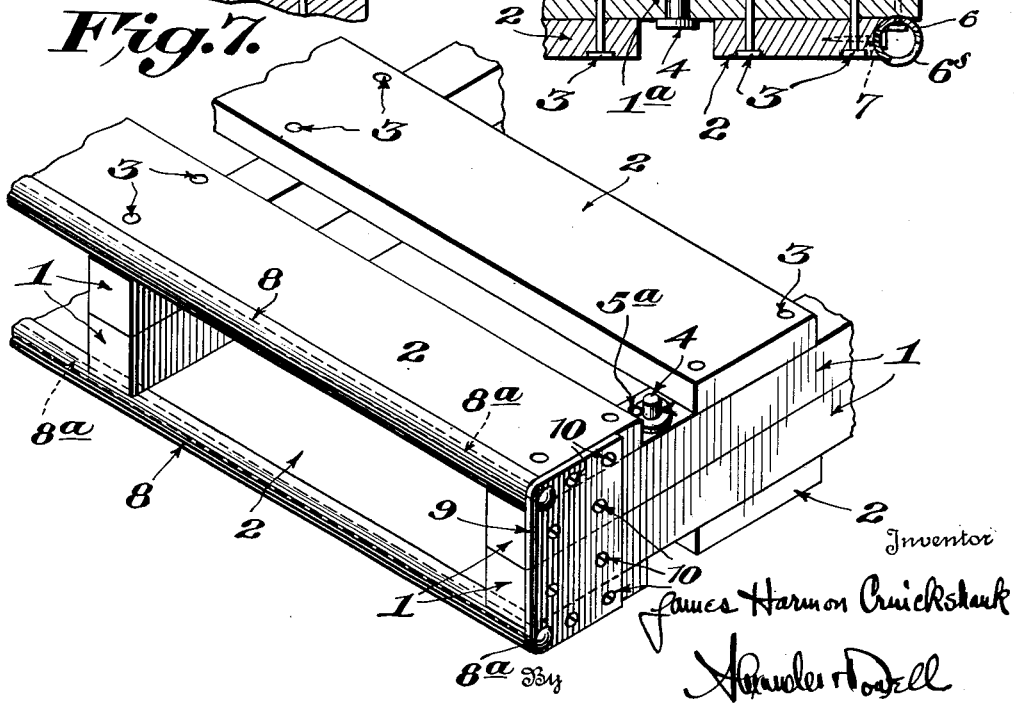

Patented Sept. 29, 1942

2,297,347

UNITED STATES PATENT OFFICE 2,297,347

PALLET

James Harmon Cruickshank, Big Indian, N. Y., assignor, by direct and mesne assignments of thirty-five per cent to Florence Baxter Cruickshank, thirty-five per cent to James Harmon Cruickshank, five per cent to James Harmon Cruickshank, Jr., five per cent to John Emmett Cruickshank, five per cent to Robert William Cruickshank, and fifteen per cent to Alice Carol Cruickshank, all of Big Indian, N. Y.

Application February 2, 1942, Serial No. 429,307

16 Claims. (Cl. 248—120)

This invention is a novel improvement in pallets adapted to be used in warehouses or the like, in connection with lift trucks, for storing thereon packaged goods, said pallets receiving and retaining the load when stored, and the pallets often being superimposed in tiers, each pallet resting directly upon the load carried by the underlying pallet.

In order for warehousemen or others to adopt the stacking pallet system, expenditures are necessary to cover the cost of a large number of pallets, exclusive of the cost of lift trucks, since the pallets are stored in tiers in the warehouses with the loads on them. While the pallet system presents many advantages over the old method of using hand trucks and skid platforms to move the goods in and out of the warehouses, still the cost of the trucks and pallets is a heavy investment, and usually it takes about one year's use to amortize the initial cost. Therefore it is extremely desirable to manufacture the pallets at as low a cost as possible or their installation would be prohibitive.

Two-faced pallets have heretofore largely been used manufactured out of hardwood, cleats and cross-boards in order to give maximum strength thereto, the pallets consisting usually of three spaced parallel hardwood cleats connected transversely by boards secured to the upper and lower faces of the cleats by means of relatively expensive and not very efficient drive screw nails in order to help resist the tendency of the boards from becoming loosened from the cleats. However, it was found that notwithstanding the use of drive-screw nails, the greatest difficulty with such pallets resided in keeping the cross-boards fastened to the cleats under continuous hard usage, the lifting fingers or arms of the lift truck being inserted into the openings between the upper and lower boards of the pallet and also between the side and center cleats when the pallet with its load is lifted, carried, and deposited to form a tier in storage, the same procedure being followed when the pallets are removed from the tier for shipment of the load. Even the slight but constant jarring incurred in the use of the pallets plays a very important part in loosening the boards and raising the nail heads above the boards so that they may injure and tear the packages and bags carried on the pallet.

In pallets heretofore used in which the cleats and boards were held together by drive-screw nails, the cost of such nails was much more than for ordinary nails. Although screw nails have a greater holding power, it was also found necessary to increase said holding power by using 2" x 4" cleats formed of hardwood; but in the lumber trade 2" x 4" hardwood is not a standard size and therefore such cleats were in fact difficult and expensive to procure or manufacture.

One object of my invention is to provide an improved two-faced pallet of the above type, my pallet being formed of two sections which are secured together to form a unitary pallet in order that the nails, used to secure the cross-boards to their respective cleat sections, when driven through the boards and cleat sections can be clinched by bending the outer ends thereof across the lower face of the cleat sections, thus turning the nails into rivets with a consequent 100% holding power. Also, of course, my pallet is vastly strengthened and has at least double the life and half the repairs of the best of present nailed pallets. Moreover in my invention ordinary nails are used. These effect an economy over the use of drive-screw nailed pallets, such that the added cost of making my pallet in two sections and fastening them together is not over 5% more than the ordinary half as efficient pallet. In other words mine is a 100% better pallet at only 5% more cost. Also obviously the nail heads in my pallet cannot project above the surface of the boards. According to my invention the pallets are formed of two opposed symmetrical sections permitting the clinching or riveting of the nails which connect the cleats and the boards which nails are clinched or riveted before the opposed sections are secured together by one of several means, probably the most simple being ordinary inexpensive spike nails passing through the superimposed cleat sections between the spaces between adjacent boards and then, if desired, slightly battered or riveted at their opposite ends. However, ordinary nails, or bolts, can be used.

Also, of course, the fastening means can be passed through the four corners of the pallets passing through the top board then through the superimposed cleats and on through the lower board on the opposite face of the pallet. This form obviates the use of the four clinched nails at the four corners and greatly adds to the strength and resistance of the four outer boards of the pallet to the more or less unavoidable and severe blows given them when the fingers of the trucks are inserted in the pallets preliminary to lifting and moving them around.

Another object of the invention is to provide a pallet which is susceptible of ready repair, since if one section of the pallet wears or is damaged a new section may be interchanged with the worn section to form a substantially new pallet.

A further object of my invention is to provide a novel sectional pallet in which ordinary nails may be used which may be clinched to give maximum strength; and in which it is possible to use standard softwood lumber on the market for the cleats, the use of softwood reducing the gross weight of the pallets. Besides providing a very much stronger and lighter pallet than those in present use, the clinching of the nails in my pallet effectively prevents the boards from working loose from the cleats; and prevents the nails from working upwardly so as to project above the boards, thus preventing ripping of the goods piled thereon, especially bagged goods.

A still further object of the invention is to provide novel bumper means for preventing splintering of the edges of the boards of the pallet around the end openings during insertion of the lifting fingers of the lift trucks into the pallets, particularly when the lifting fingers have not first been properly aligned and spaced with respect to said openings before attempting to insert same thereinto; said bumper means also preventing injury to the workmen handling pallets due to splintered or torn edges, and further permitting use of shallower openings, i. e., cleats of less depth.

Other objects of the invention will be hereinafter set forth.

I will explain the invention with reference to the accompanying drawings which illustrate several practical embodiments thereof to enable others familiar with the art to adopt and use the same; and will summarize in the claims the novel features of construction, and novel combinations of parts, for which protection is desired.

In said drawings:

Fig. 1 is a perspective view illustrating the use of two-faced pallets for storing packaged goods in warehouses, and showing one of said pallets with its load being deposited or removed from a stack or tier by the lift truck.

Fig. 2 is an enlarged perspective view of one form of my novel pallet.

Fig. 3 is a perspective view showing a modified pallet.

Fig. 4 is an enlarged section on the line 4—4, Fig. 2.

Fig. 4a is a section similar to Fig. 4 but showing a modification.

Fig. 5 is a perspective view of a modified pallet having bumper means at the openings for the lifting fingers of the lift truck adapted to prevent damage to the edges of the boards during insertion of said lifting fingers into said openings.

Fig. 6 is an enlarged section on the line 6—6, Fig. 5.

Fig. 6a is a section similar to Fig. 6 but showing a modification.

Fig. 7 is a perspective view of a portion of a further modified pallet in which the bumper means is rotatably mounted on the pallet so as to roll on the lifting fingers which may engage the bumper means, if not properly aligned, when the lifting fingers are being inserted into the pallet openings therefor.

As shown in Fig. 1, the pallets A with their superimposed loads B are handled and stacked in tiers by means of lifting trucks C having vertically movable lifting fingers which are inserted into openings between the upper and lower faces at the sides of the pallets, the pallets A with their superimposed loads B being placed upon, or removed from, the load on the underlying pallets, the load remaining upon each pallet when in stacked relation.

Heretofore, such pallets have comprised three spaced parallel cleats extending the full length of the pallet, said cleats being usually of hardwood of size 2" x 4"; and across the cleats in spaced relation are boards secured to their upper and lower faces by means of drive-screw nails. Such pallets are necessarily expensive due to the use of hardwood of a size which is not standard, and to the use of drive-screw nails. Moreover, constant handling of the pallets has a tendency to pull the boards away from the cleats even where hardwood lumber and drive-screw nails are used, thus rendering the pallets after a short period of usage useless for storage purposes. One of the most serious faults that develops in ordinary nailed pallets, and often overlooked or ignored because seemingly unavoidable, after the pallets have been in use for some time, is the loosening of the nails so that nail heads project above the surface of the platforms. These nail heads tear cartons of packaged goods, particularly goods shipped in bags.

According to my invention the pallet is made of two opposed similar sections, each section comprising three parallel spaced cleat sections 1 extending the full width of the pallet, each cleat being of depth only one-half the required depth of the opening for the lifting fingers of the lift truck between the boards at the sides of the pallet. Disposed across the cleats 1 of each pallet section are cross-boards 2 which, as shown in Figs. 4 and 4a, are secured to the cleats by two (or more) standard nails 3 of somewhat greater length than the overall thickness of the boards 2 and cleat sections 1, said nails having their lower ends clinched as at 3a to securely lock the boards to said cleats even though the cleats are of softwood. Preferably each cleat section 1 is of size not exceeding 2" x 2" but in actual practice may be 1¾" x 1⅞".

Boards 2 are arranged in spaced relation on the cleat sections; and after both pallet sections have been thus completed and the nails 3 clinched as above described, the two pallet sections are superimposed in opposed relation and are secured together in any desired manner. As shown in Fig. 4, holes 1a may be drilled through the superimposed cleat sections 1 intermediate the cross-boards 2 adjacent the four corners of the pallet, and bolts 4 carrying nuts 5 inserted through said holes 1a, the heads of the bolts and the nuts 5 terminating below the planes of the outer surfaces of the upper and lower boards 2 so as not to rip or otherwise injure containers, bags, or packages when loaded on the pallet.

Instead of using bolts 4, however, the pallet sections may be secured together to form a unitary structure by means of bolts 4 provided with cotter pins 5a (Fig. 7); or by means of pins 4 having riveted heads (Fig. 6); or simply by means of long standard nails 4 (Fig. 4a) whose ends may be riveted, or clinched over as at 4x (Fig. 4a) in the manner of nails 3 (Fig. 4) to secure the superimposed pallet sections together. Any other desired means for securing the pallet sections together may however be used; for instance, the cleat sections may be secured together by wire wrappings at any points desired.

Also, if desired, the pallet sections may be secured together at their four corners by means of four rivets 4 as shown in Fig. 3, said rivets passing entirely through the upper and lower boards 2 and both cleat sections 1 and thus lessening the tendency of the boards 2, adjacent the openings for the lift truck fingers, from becoming loosened from the cleats 1. However the heads of the rivets 4 should be rounded or flattened to prevent injury to the load on the pallet.

The use of sectional pallets, as above described, permits the use of clinched nails 3 to hold the boards 2 to the cleats 1, a feature not feasible when using the solid hardwood cleats of size 2" x 4", said clinching thus vastly increasing the holding power of the nails.

In Fig. 5 a modified form of pallet is illustrated, but similar parts are similarly numbered. In practice it has been found that a great weakness in the present pallets is the breaking and splintering and loosening of the boards 2 at the ends of the pallets when same are inadvertently struck by the ends of the lifting fingers of the lift truck if said fingers have not been properly aligned before entering the openings at the sides of the pallet between the cleats 1 and the top and bottom boards 2 preparatory to lifting the pallets and their loads.

As shown in Figs. 5 and 6, the outermost crossboards 2 of the pallet at the upper and lower faces are inset slightly from the ends of the cleats 1, and lengths of pipe 6 (preferably ¾" in diameter) are placed in the shoulders formed between the outer edges of the boards and the faces of the cleats, the pipe lengths being secured in position on the pallets by means of nails 7 driven through the pipe into the cleats 1 or into the edges of boards 2, or both, the pipe sections 6 thus providing an effective bumper or rubbing strip so that when improperly aligned lifting fingers are entered into the openings between boards 2 and cleats 1 the pipe sections 6 will protect the outer edges of the boards from shredding, tearing, battering, splitting, splintering, or other injury. Preferably the pipe sections 6 are slotted as at 6s in way of the nails 7, and the nails are driven at spaced intervals into the boards 2. The use of the pipe sections 6 also prevents injury to workmen which might be encountered due to handling of the splintered and torn edges of the boards 2.

Instead of utilizing pipe sections 6, the exposed edges of the end cross-boards 2 of the openings might be covered by strips of rubber and fabric composition 16 (Fig. 6a) obtained by cutting strips from discarded automobile tires or the like, said strips 16 being secured by nails 17 or the like. Such strips would afford a very efficient guard and protection and furthermore would be of lighter weight and cheaper than the pipe sections, and such strips could be normally obtained in unlimited quantity.

In Fig. 7 a further modified means for preventing splintering of the edges of the crossboards 2 is shown. In this construction pipe sections 8 are disposed similarly to pipes 6 of Figs. 5 and 6. However, pipe sections 8 are rotatably mounted on the pallets so that same may revolve and thus roll upon the lifting fingers of the lift truck in event the fingers are not properly aligned before entering the openings in the sides of pallets. In this modification at each corner of the pallet is a plate 9 secured by bolts or screws 10 to the ends of the upper and lower boards 2 and to the side faces of the upper and lower cleat sections 1, said plates 9 serving to further secure the sections of the pallet together in addition to or in place of the rivets, bolts, or nails 4. The outer corners of the plates 9 project across the shoulder formed between the outer edges of the boards 2 and the upper or lower faces of the cleats 1, and may be provided with perforations receiving the ends of a rod 8a (Fig. 7) upon which the pipe sections 8 are rotatably mounted so that when the pipe is engaged by the lifting fingers the pipe will roll on the fingers and thus prevent injury to the edges of the board 2 at the opening for the fingers.

Instead of using rods 8a (Fig. 7), the corners of the plates 9 may be provided with bearing projections entering the ends of the pipe sections 8, to effect a reduction in the cost of material and in weight. Instead of using plate 9, other means may be provided for rotatably mounting the pipe sections 8 on the pallets such as, for instance, straps secured between the end boards 2 and the cleats 1 having lugs entering the ends of the pipe sections 8, thus enabling the pipes to rotate on the pallets.

The use of the bumper means 6 or 8 at the edges of the openings in the pallets for the lifting fingers of the lift truck presents another advantage in that the provision of guards on the edges of the pallet (possibly only the top edges) whether of rubber or pipe, permits the use of cleat sections 1 which when combined form a composite 2" x 3" cleat instead of the customary 2" x 4" cleat, since the opening for the lifting fingers may be made of considerably less depth in view of the fact that the lifting fingers cannot injure the boards, and therefore the openings need not be as deep as heretofore used. This possibility not only reduces the cost and weight of the pallet, but further provides considerable increase in valuable warehouse space. Since present pallet cleats ordinarily are 2 x 4 inches in size this saving in storage space is about 16% of the cubic space occupied by a pallet. Even more important is the fact that this further reduces the weight of the pallet. Both of these are additional valuable features.

My novel two-faced pallet is for all practical purposes as strong as a pallet put together with bolts, but can be manufactured for about one-third the usual cost. Besides having possibly twice the strength of present type pallets put together with drive-screw nails, my novel pallet offers several other important features which neither drive-screw nailed nor bolted pallets have, since only a 3 inch opening in my pallet is necessary to accommodate the lifting fingers, thus resulting in a saving of about 15% of valuable storage space, over and above the use of pallets having the usual 4 inch opening between pallet faces. Moreover, the leading edges of my pallets cannot be torn or damaged by the prongs or fingers of the lift trucks. At present this form of damage necessitates repairs, but worst of all causes injury, compensation, and other expenses to workmen who handle the present type pallets and the goods on and off such pallets. Moreover, my novel pallets permit greater salvage as the pallets deteriorate and require repairs. Furthermore, my pallets will far outwear the drive-screw nailed pallets, and will about equal the life of bolted pallets.

I do not limit my invention to the exact forms shown in the drawings for obviously changes may be made therein within the scope of the claims.

I claim:

1. A pallet comprising opposed superimposed sections; each section comprising spaced parallel cleats, cross-boards connecting said cleats and nails of greater length than the thickness of the boards and cleats passing therethrough, the ends of the nails being clinched over the cleats; and means connecting the cleats of the superimposed sections together.

2. In a pallet as set forth in claim 1, said means comprising bolts extending through bores in the cleats, the heads and nuts of the bolts being disposed below the planes of the upper and lower faces of the pallet.

3. In a pallet as set forth in claim 1, said means comprising nails of greater length than the combined thickness of the superimposed cleats, the outer ends of the nails being clinched over the faces of the cleats.

4. A two-faced pallet for lift trucks having lifting fingers, said pallet comprising spaced parallel cleats, cross-boards connecting said cleats and secured to the upper and lower faces thereof, the spaces between the boards and cleats at the sides of the pallet forming openings to receive the lifting fingers, bumper means at the outer edges of the boards in way of said openings, the end cross boards being inset from the ends of the cleats to form shoulders between the boards and cleats; and said bumper means comprising pipe lengths disposed in said shoulders and secured to said boards and cleats.

5. A two-faced pallet for lift trucks having lifting fingers, said pallet comprising spaced parallel cleats, cross-boards connecting said cleats and secured to the upper and lower faces thereof, the spaces between the boards and cleats at the sides of the pallet forming openings to receive the lifting fingers, bumper means at the outer edges of the boards in way of said openings, the end cross boards being inset from the ends of the cleats to form shoulders between the boards and cleats; and said bumper means comprising pipe lengths disposed in said shoulder; means for securing said pipe lengths to said boards and cleats; and said pipe lengths being slotted in way of said securing means.

6. A two-faced pallet for lift trucks having lifting fingers, said pallet comprising spaced parallel cleats, cross-boards connecting said cleats and secured to the upper and lower faces thereof, the spaces between the boards and cleats at the sides of the pallet forming openings to receive the lifting fingers, bumper means at the outer edges of the boards in way of said openings, said bumper means comprising strips of rubber and fabric composition secured to the outer edges of the boards.

7. A two-faced pallet for use with lifting trucks having lifting fingers, comprising spaced parallel cleats, cross boards connected with said cleats and secured to the upper and lower faces thereof, the spaces between the boards and cleats at the ends of the pallet forming openings to receive the lifting fingers, and rotatable bumper means at the outer edges of the boards in way of the openings.

8. In a pallet as set forth in claim 7, the ends of the cross boards being inset from the ends of the cleats to form shoulders between the boards and cleats; plates at the corners of the pallets extending opposite said shoulders, and said rotatable bumper means comprising pipe lengths rotatably journaled between said plates.

9. In a pallet as set forth in claim 7, the ends of the cross boards being inset from the ends of the cleats to form shoulders between the boards and cleats; plates at the corners of the pallets extending opposite said shoulders, a rod having its ends mounted in said plates, and said rotatable bumper means comprising pipe lengths rotatably mounted on said rod.

10. A pallet for lift trucks having lifting fingers, comprising opposed superimposed sections; each section comprising spaced parallel cleats, spaced cross boards connected to said cleats and nails of greater length than the thickness of the boards and cleats passing therethrough having their ends clinched over the cleats; means connecting the cleats of the sections together; the spaces between the boards and cleats at the sides of the pallet forming openings to receive the lifting fingers; bumper means at the outer edges of the boards in way of the openings, the end cross boards being inset from the ends of the cleats to form shoulders between the boards and cleats; and said bumper means comprising pipe lengths disposed in said shoulders and secured to said boards and cleats.

11. A pallet for lift trucks having lifting fingers, comprising opposed superimposed sections; each section comprising spaced parallel cleats, spaced cross boards connected to said cleats and nails of greater length than the thickness of the boards and cleats passing therethrough having their ends clinched over the cleats; means connecting the cleats of the sections together; the spaces between the boards and cleats at the sides of the pallet forming openings to receive the lifting fingers; bumper means at the outer edges of the boards in way of the openings, the end cross boards being inset from the ends of the cleats to form shoulders between the boards and cleats; and said bumper means comprising pipe lengths disposed in said shoulder; means for securing said pipe lengths to said boards and cleats; and said pipe lengths being slotted in way of said securing means.

12. A pallet for lift trucks having lifting fingers, comprising opposed superimposed sections; each section comprising spaced parallel cleats, spaced cross boards connected to said cleats and nails of greater length than the thickness of the boards and cleats passing therethrough having their ends clinched over the cleats; means connecting the cleats of the sections together; the spaces between the boards and cleats at the sides of the pallet forming openings to receive the lifting fingers; bumper means at the outer edges of the boards in way of the openings, said bumper means comprising strips of rubber and fabric composition secured to the outer edges of the boards.

13. A pallet for lift trucks having lifting fingers, comprising opposed superimposed sections; each section comprising spaced parallel cleats, spaced cross boards connected to said cleats and nails of greater length than the thickness of the boards and cleats passing therethrough having their ends clinched over the cleats; means connecting the cleats of the sections together; the spaces between the boards and cleats at the sides of the pallet forming openings to receive the lifting fingers; and rotatable bumper means at the outer edges of the boards in way of the openings.

14. In a pallet as set forth in claim 13, the ends of the cross boards being inset from the ends of the cleats to form shoulders between the boards and cleats; plates at the corners of the pallets extending opposite said shoulders, and said rotatable bumper means comprising pipe lengths rotatably journaled between said plates.

15. In a pallet as set forth in claim 13, the ends of the cross boards being inset from the ends of the cleats to form shoulders between the boards and cleats; plates at the corners of the pallets extending opposite said shoulders, a rod having its ends mounted in said plates, and said rotatable bumper means comprising pipe lengths rotatably mounted on said rod.

16. A pallet for lift trucks having lifting fingers, comprising spaced parallel cleats, cross boards connecting said cleats, the spaces between the boards and cleats at the sides of the pallet forming openings to receive the lifting fingers; bumper means at the outer edges of the boards in way of the openings, the ends of the cross boards being inset from the ends of the cleats forming shoulders between the boards and cleats; plates at the corners of the pallets extending opposite said shoulders, and said bumper means comprising pipe lengths rotatably journaled between said plates.

JAMES HARMON CRUICKSHANK.